June 5, 1956 E. W. HAWKINSON 2,748,423
TIRE MOLD
Filed Feb. 11, 1955
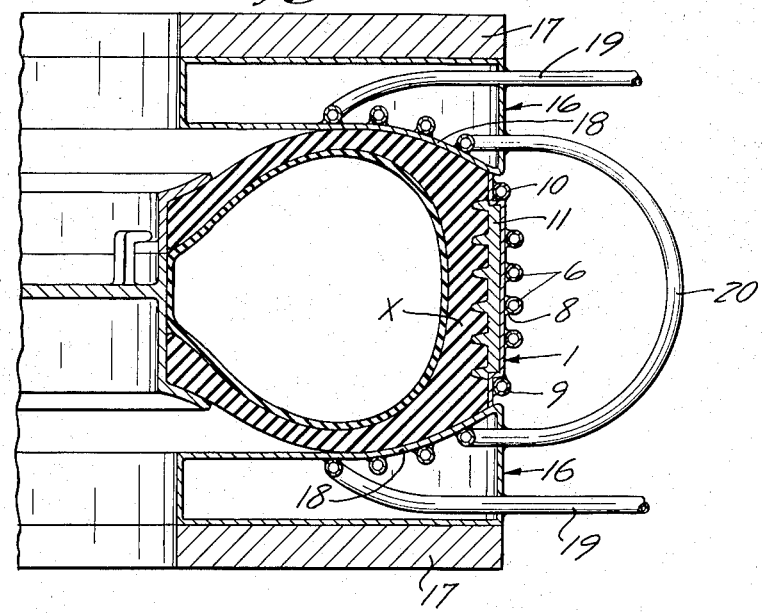
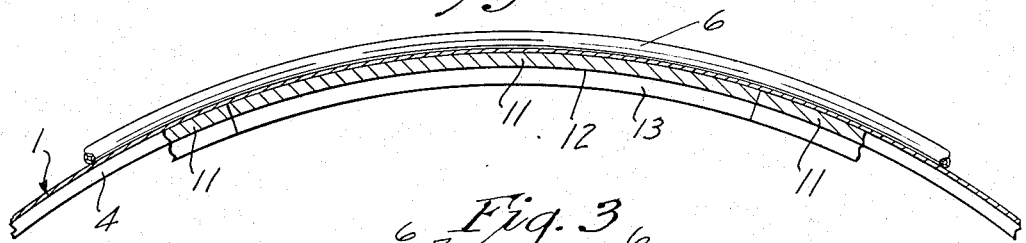
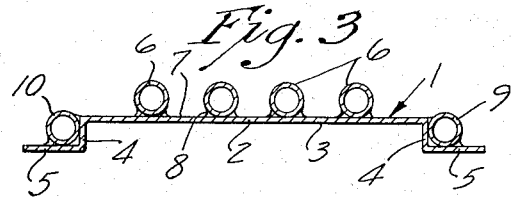
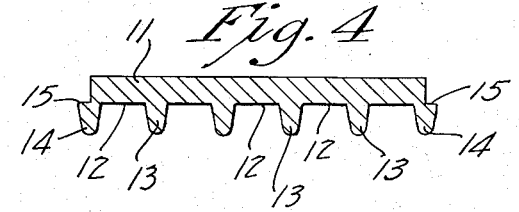
INVENTOR.
Earle W. Hawkinson
BY
Merchant & Merchant
ATTORNEYS

United States Patent Office 2,748,423
Patented June 5, 1956

2,748,423
TIRE MOLD

Earle W. Hawkinson, Minneapolis, Minn., assignor to Paul E. Hawkinson Company, Minneapolis, Minn., a corporation of Minnesota Application February 11, 1955, Serial No. 487,497

4 Claims. (Cl. 18—18)

My invention relates to tire retreading devices and more particularly to tire retreading molds of a type wherein the treads are applied to the external peripheral surfaces of the worn tire casings under tension, that is at diameters approximating the rolling radii of said tire casings as distinguished from their inflated radii.

More particularly, my invention relates to devices of the class immediately above described wherein generally cylindrical sheet metal molds of the type disclosed in Patent No. 1,917,261 are utilized.

Still more specifically, my invention relates to improvements in molds of the type incorporating endless cylinderlike sheet metal band forming sections and cooperating opposed side wall engaging mold elements adapted to make sealing engagement with the opposite side edges of said sheet metal band. In devices of this character the cost of producing the sheet metal bands not only has heretofore been excessive, but also said bands as previously built have been lacking in strength, ruggedness, and durability.

The above and still further objects of my invention will become apparent from the following detailed specification, appended claims, and attached drawings.

Referring to the drawings, wherein like characters are indicated by like parts throughout the several views:

Fig. 1 is a fragmentary view of my novel mold in position upon a pneumatic tire casing during application of a retread thereto;

Fig. 2 is a fragmentary view partly in longitudinal section and partly in side elevation;

Fig. 3 is an enlarged view in transverse section of the primary mold element shown in Fig. 1; and Fig. 4 is a view in transverse section of the segmental mold section shown in Fig. 1.

Referring with greater particularity to the drawings, the numeral 1 indicates a primary mold element formed from sheet metal. The primary mold element 1 is endless and generally cylindrical in form and is formed to provide a central readily inwardly opening U-shaped channel 2 shown as being cross sectionally U-shaped in form and having a cylindrical bottom 3 and radially inwardly projecting side edges 4. Formed integrally with and bent at right angles thereto are marginal flanges 5 on opposite sides of the channel 2. Mold section 1 is heated by means of an endless steam conduit or tubing 6 wound spirally thereabout and fused to the outer peripheral surface 7 by any suitable means such as welding or brazing indicated by the numeral 8. The convolutions 9 and 10, at the opposite sides of the mold 1 shown as being fused in part to the outer side walls 4 of the channels 2 and in part to the marginal flanges 5 whereby to greatly strengthen and stabilize said flanges.

Shown as being nestingly received within the channel 5 in side by side relationship so as to extend completely thereabout, are a plurality of segmental matrix forming sections 11 preferably formed from cast aluminum or the like. Matrix sections 11 may be secured within the channels 2 by any suitable means, not shown. Matrix sections 11 have maximum internal diameters, measured from points 12, corresponding to the internal diameters of the marginal flanges 5 and the tread design forming portion 13 project radially inwardly from points 12. Preferably and as shown, the matrix sections 11 define continuous tread design forming ribs 14 at their opposite side edges. As shown, design forming ribs 14 overlie in part as at 15 the adjacent marginal flanges 5 and thus further strengthen the flanges 5.

Sheet metal primary mold elements 1 act as a relatively rugged and durable shell for the reception of matrix sections 11 of any given design, and the cost and time consumed in changing from one design to another is not excessive.

Adapted to cooperate with the primary mold element 1, with suitable matrix sections 11 therein, are a pair of secondary mold elements 16 shown as being secured to opposed side plates 17, the latter of which are provided with conventional means, not shown, for exerting clamping pressure thereon. Preferably and as shown, the secondary mold sections 16 are formed from sheet metal and have opposed arcuate portions 18 adapted to make sealing contact with the edges of the marginal flanges 5 to place a so-called "full cap" upon the tire casing X. Vulcanizing heat is preferably imparted to the secondary mold element 16 by means of tubular steam conduits 19 and connecting conduit 20. Heat to the conduits 6 and 19 is preferably selective. This is important because less heat is required to cure the side wall portions of the newly applied tread than is required to cure the relatively thick road engaging portion immediately underlying the matrix sections 11. This arrangement enables heat to be cut off from the rubber in engagement with the secondary mold element 16 without disturbing the heat being circulated through conduit 6.

My invention has been thoroughly tested and found to be completely satisfactory for the accomplishment of the above objects, and while I have disclosed a preferred embodiment thereof, it should be obvious that same is capable of modification without departure from the scope of the appended claims.

What I claim is:

1. In a device of the class described, a primary mold element, said primary mold element being formed from sheet metal and providing a relatively wide endless radially inwardly opening central matrix receiving channel and relatively narrow cylindrical flanges at its opposite marginal edges, a plurality of segmental matrix sections in end to end relationship in said channel, opposed secondary mold elements adapted to engage the opposite sides of a tire casing and make sealing engagement with said flanges, and heating means for said mold sections 2. The structure defined in claim 1 in which the heating means for said primary mold section includes a plurality of laterally spaced convolutions of heating coil fused to the external peripheral surface thereof, the convolutions adjacent the opposite edges of said mold section being used in part to the adjacent sides of said channels and in part to said marginal flanges whereby to impart great rigidity to said flanges.

3. The structure defined in claim 2 in which the maximum internal diameter of the circle defined by said matrix sections corresponds approximately to the internal diameter of said marginal flanges.

4. The structure defined in claim 3 in which said matrix sections are provided with continuous radially inwardly projecting tread design forming ribs, said ribs overlying in part said marginal flanges.

References Cited in the file of this patent

UNITED STATES PATENTS

| | | |
|---|---|---|
| 2,327,639 | Heintz | Aug. 24, 1943 |
| 2,418,584 | Hawkinson | Apr. 8, 1947 |